United States Patent Office 2,971,886

Patented Feb. 14, 1961

2,971,886

1-DEHYDRO-17-HYDROXYPROGESTERONE ACYLATES AND THERAPEUTIC COMPOSITION THEREOF

John C. Babcock, Portage Township, Kalamazoo County, and Raymond L. Pederson, Kalamazoo, Mich., assignors to The Upjohn Company, Kalamazoo, Mich., a corporation of Michigan No Drawing. Filed Nov. 27, 1957, Ser. No. 699,169

8 Claims. (Cl. 167—55)

This invention relates to 1-dehydro-17-hydroxy-progesterone acylates and to methods for the preparation of these novel compounds.

These novel compounds possess unique pharmacological activity, including oral progestational activity as will be explained below:

The compounds of this invention are prepared from the known 17α-hydroxyprogesterone 17-acetate or other 17-acylates of 17α-hydroxyprogesterone wherein the acyl radical is that of a hydrocarbon carboxylic acid containing from one to twelve carbon atoms, inclusive and may be represented schematically by the following formulae:

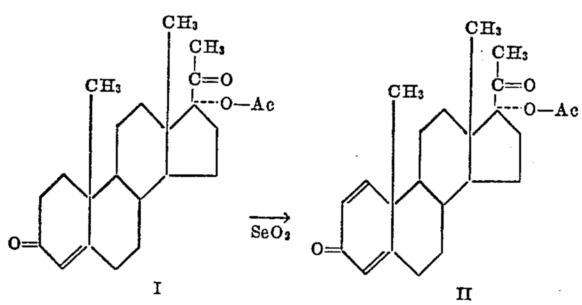

The compounds of this invention, illustrated by Formula II, above, possess a marked and unique combination of progestational and anti-inflammatory activity, possess anabolic activity and are especially valuable because they are active when administered orally. For example, 1-dehydro-17α-hydroxyprogesterone 17-acetate, possesses oral progestational activity by the well-known McPhail test comparable with the most potent progestational agents presently known. They are also active parenterally.

The compounds of Formula II are useful for the prevention or delay of pregnancy in animals, in the maintenance of pregnancy, in the treatment of dysmenorrhea and amenorrhea, in the control of ovulation, and generally as a progestational agent in the animal organism.

Administration of the compounds of this invention can be in conventional dosage forms, such as pills, tablets, capsules, solutions, syrups or elixirs for oral use, or in liquid forms which are adaptable to the natural and synthetic cortical steroid hormones for injectable products.

The 1-dehydro-17α-hydroxyprogesterone 17-acylates are also useful as ingredients in normal and dietary foods and animal feeds and in concentrates and additives to be added to foods or feeds. The compounds of this invention can be used in conjunction with coacting antibiotics, germicides or with other hormonal agents such as estrogens or androgens, e.g. estradiol or methyltestosterone.

The following example is illustrative of methods of producing the novel compounds of this invention but is not to be construed as limiting.

EXAMPLE

*1-dehydro-17α-hydroxyprogesterone 17-acetate* (II)

A mixture containing ten grams of 17α-hydroxyprogesterone 17-acetate (I), 500 milliliters of tertiary butyl alcohol, five milliliters of glacial acetic acid and four grams of selenium dioxide was warmed at reflux for 24 hours. An additional four gram portion of selenium dioxide was added and warming was continued for another 24-hour period.

The reaction mixture was cooled and filtered. The filtrate was concentrated to about 150 milliliters, then slowly diluted with 850 milliliters of water. The resulting precipitate was isolated by filtration. The precipitate was dissolved in 300 milliliters of ethyl acetate, then washed with four 100-milliliter portions of freshly prepared cold ammonium sulfide, dilute ammonium hydroxide, water, dilute hydrochloric acid and water. The solution was dried over sodium sulfate and evaporated to give 9.13 grams of crude 17α-hydroxypregna-1,4-diene-3,20-dione 17-acetate.

The crude product was dissolved in 100 milliliters of methylene chloride and 100 milliliters of Skellysolve B (a hexane hydrocarbon). The solution was then chromatographed over 400 grams of Florisil (a synthetic magnesium silicate). The product was eluted as follows in 400 milliliter fractions.

| | |
|---|---|
| Fractions 1–4 | Acetone:Skellysolve B::8:92. |
| Fractions 5–26 | Acetone:Skellysolve B::10:90. |

Fractions 12 to 16 weighed 3.3 grams and were combined and recrystallized from a mixture of acetone and Skellysolve B to give 2.51 grams of 1-dehydro-17α-hydroxyprogesterone 17-acetate (17α-hydroxypregna-1,4-diene-3,20-dione 17-acetate). The melting point of the recrystallized compound is 233 to 235 degrees centigrade; $[\alpha]_D$ plus seventeen degrees (0.95 percent, chloroform).

*Analysis*.—Calculated for $C_{23}H_{30}O_4$: C, 74.56; H, 8.16. Found: C, 74.79; H, 7.99.

The infrared absorption spectrum had typical maxima as follows: 1658 (conjugated ketone), 1622, 1600 (conjugated C=C), and 1725 centimeter$^{-1}$ (ester carbonyl).

Alternatively, the 1-dehydrogenation of 17α-hydroxyprogesterone 17-acetate can be accomplished microbiologically by fermentation with Septomyxa organisms, particularly *S. affinis* or by fermentation with Fusarium organisms, particularly *F. solani*. These bioconversions are unique in that the 17-acyl group is not hydrolyzed during the 1-dehydrogenation. As a further alternative the 1-dehydrogenation can be accomplished chemically by hydrogenating the A-ring of 17α-hydroxyprogesterone 17-acetate by known methods to 17α-acetoxypregnane 3,20-dione. This latter compound can then be dibrominated by known methods to 17α-acetoxy-2,4-dibromopregnene-3,20-dione and subsequently dehydrobrominated.

Substitution of other 17-acylates in the procedure of the foregoing example is productive of the corresponding 1-dehydro-17α-hydroxyprogesterone 17-acylates. Thus 17α-hydroxyprogesterone 17-formate, -17-propionate, -17-butyrate, -17-isobutyrate, -17-valerate, -17-enanthate, -17-caproate, -17-caprylate, -17-propiolate, -17-crotonate, -17-maleate, -17-benzoate, -17-cyclopentylpropionate, -17-phenylacetate, -17-phenylpropionate, -17-trimethylacetate, -17-t-butylacetate, -17-cyclopentylcarboxylate, -17-ethylbutyrate, -17-o-toluate, -17-dodecanoate, or the 17-cyclohexylacetate is productive of 1-dehydro-17α-hydroxyprogesterone 17-formate,
1-dehydro-17α-hydroxyprogesterone 17-propionate,
1-dehydro-17α-hydroxyprogesterone 17-butyrate,
1-dehydro-17α-hydroxyprogesterone 17-isobutyrate,
1-dehydro-17α-hydroxyprogesterone 17-valerate, 1-dehydro-17α-hydroxyprogesterone 17-enanthate,
1-dehydro-17α-hydroxyprogesterone 17-caproate,
1-dehydro-17α-hydroxyprogesterone 17-caprylate,
1-dehydro-17α-hydroxyprogesterone 17-propiolate,
1-dehydro-17α-hydroxyprogesterone 17-crotonate,
1-dehydro-17α-hydroxyprogesterone 17-maleate,
1-dehydro-17α-hydroxyprogesterone 17-benzoate,
1-dehydro-17α-hydroxyprogesterone 17-cyclopentylpropionate,
1-dehydro-17α-hydroxyprogesterone 17-phenylacetate,
1-dehydro-17α-hydroxyprogesterone 17-phenylpropionate,
1-dehydro-17α-hydroxyprogesterone 17-trimethylacetate,
1-dehydro-17α-hydroxyprogesterone 17-t-butylacetate,
1-dehydro-17α-hydroxyprogesterone 17-cyclopentylcarboxylate,
1-dehydro-17α-hydroxyprogesterone 17-ethylbutyrate,
1-dehydro-17α-hydroxyprogesterone 17-o-toluate,
1-dehydro-17α-hydroxyprogesterone 17-dodecanoate, and the
1-dehydro-17α-hydroxyprogesterone 17-cyclohexylacetate, respectively.

It is to be understood that the present invention is not to be limited to the exact details of operation shown and described, as obvious modifications and equivalents will be apparent to one skilled in the art, and the invention is therefore to be limited only by the scope of the appended claims.

We claim:

1. 17-acylates of 1-dehydro-17α-hydroxyprogesterone in which the acyl group is that of a hydrocarbon carboxylic acid containing from one to twelve carbon atoms, inclusive.

2. 1-dehydro-17α-hydroxyprogesterone acetate.

3. An oral composition for treatment of hormonal disturbances comprising as an active ingredient 1-dehydro-17α-hydroxyprogesterone 17-acylate and a pharmaceutical diluent.

4. An oral composition for treatment of hormonal disturbances comprising as an active ingredient 1-dehydro-17α-hydroxyprogesterone acetate and a pharmaceutical diluent.

5. An oral composition in dosage unit form for treatment of hormonal disturbances comprising 1-dehydro-17α-hydroxyprogesterone acetate, an estrogenic material, and a pharmaceutical diluent.

6. The composition of claim 5 in which the estrogenic material is estradiol.

7. An oral composition in dosage unit form for treatment of hormonal disturbances comprising 1-dehydro-17α-hydroxyprogesterone 17-acylate, an androgenic material, and a pharmaceutical diluent.

8. The composition of claim 7 in which the androgenic material is 17-methyltestosterone.

References Cited in the file of this patent

UNITED STATES PATENTS

| | | |
|---|---|---|
| 2,579,479 | Djerassi et al. | Dec. 25, 1951 |
| 2,753,360 | Kaspar et al. | July 3, 1956 |
| 2,783,226 | Gould et al. | Feb. 26, 1957 |

OTHER REFERENCES

Turner: J. Am. Chem. Soc., 75, 3489–92 (1953).
Ringold et al.: J. Org. Chemistry, 21, 239–40 (1956).
Meystre et al.: Helv. Chim. Acta, 39, 734–42 (1956).